(12) United States Patent
Warendorf

(10) Patent No.: US 6,183,801 B1
(45) Date of Patent: Feb. 6, 2001

(54) GELLED FOOD COMPOSITION INCLUDING FRUIT PIECES AND ITS PREPARATION

(75) Inventor: Thomas Warendorf, D-Muehldorf (DE)

(73) Assignee: Nestec S.A., Vevey (CH)

( * ) Notice: Under 35 U.S.C. 154(b), the term of this patent shall be extended for 0 days.

(21) Appl. No.: 09/220,420

(22) Filed: Dec. 24, 1998

(30) Foreign Application Priority Data

Jan. 19, 1998 (EP) .................................................. 98100796

(51) Int. Cl.$^7$ ....................................................... A23L 1/06
(52) U.S. Cl. ........................ 426/573; 426/577; 426/526; 426/575
(58) Field of Search .................. 426/573, 576, 426/577, 575

(56) References Cited

U.S. PATENT DOCUMENTS

| | | | |
|---|---|---|---|
| 1,950,935 | * | 3/1934 | Thomas ................................ 426/573 |
| 1,955,849 | * | 4/1934 | Finley .................................. 426/573 |
| 2,441,729 | * | 5/1948 | Steiner ................................. 426/573 |
| 2,466,146 | * | 4/1949 | Baker ................................... 426/575 |
| 2,821,479 | * | 1/1958 | Forkner ................................ 426/573 |
| 2,864,706 | * | 12/1958 | Stoloff ................................. 426/573 |
| 2,992,925 | * | 7/1961 | Green et al. ......................... 426/573 |
| 3,060,032 | * | 10/1962 | Glicksman ........................... 426/573 |
| 3,342,612 | * | 9/1967 | Foster et al. ......................... 426/573 |
| 3,367,783 | * | 2/1968 | Billerbeck ............................ 426/573 |
| 3,367,784 | * | 2/1968 | Waitman et al. .................... 426/573 |
| 3,445,243 | * | 5/1969 | Moirano ............................... 426/573 |
| 3,556,810 | | 1/1971 | Moirano ............................... 99/131 |
| 3,615,645 | * | 10/1971 | Forkner ................................ 426/573 |
| 3,658,556 | | 4/1972 | Klein et al. .......................... 99/131 |
| 3,962,482 | * | 6/1976 | Comer et al. ........................ 426/575 |
| 4,369,125 | * | 1/1983 | Kragen et al. ....................... 426/574 |
| 4,370,354 | * | 1/1983 | Leipold ................................ 426/573 |
| 4,501,763 | * | 2/1985 | Yuguchi et al. ...................... 426/573 |
| 4,563,366 | * | 1/1986 | Baird et al. .......................... 426/573 |
| 4,647,470 | * | 3/1987 | Sanderson et al. .................. 426/573 |
| 4,746,528 | * | 5/1988 | Prest et al. ........................... 426/573 |
| 4,752,489 | | 6/1988 | Wallace et al. ...................... 426/401 |
| 4,894,250 | * | 1/1990 | Musson et al. ...................... 426/573 |
| 5,063,073 | * | 11/1991 | Kratochvil ........................... 426/573 |
| 5,356,653 | * | 10/1994 | Lathrop ................................ 426/573 |
| 5,385,747 | | 1/1995 | Katz et al. ............................ 426/573 |

(List continued on next page.)

Primary Examiner—Cynthia L. Nessler
(74) Attorney, Agent, or Firm—Vogt & O'Donnell, LLP

(57) ABSTRACT

A gelled food composition containing fruit pieces distributed therein is obtained by preparing, separately, a jelly ground mass composition and a fruit composition which contains fruit pieces and then combining the two compositions and cooling to obtain the gelled composition wherein (a) to prepare the jelly ground mass, ingredients, in amounts by weight based upon jelly ground mass weight, of from 15% to 30% sugar, of from 0.4% to 0.7% xanthan and of a gelling agent which is (i) from 0.5% to 1.5% of a carrageenan composition, (ii) from 0.4% to 1.0% of a carrageenan composition and from 0.1% to 0.5% locust bean gum and (iii) from 0.1% to 0.5% of gellan gum, are blended into water at a temperature so that the ingredients are suspended in the water, and (b) the fruit composition is prepared with fruit pieces and with xanthan in an amount, by weight based upon the weight of the fruit composition, of from 0.4% and 0.7%. Both compositions are heated to a temperature and for a time to at least pasteurize them, and to obtain the final gelled composition, the fruit composition, at a temperature of from 10° C. to 20° C., is injected into a stream of the jelly ground mass having a temperature which is not below a temperature which effects gellation, and the composition so combined is heated to a temperature above 70° C. for preventing gellation and filled into a container which then is sealed and cooled to gel the product to obtain the gelled product in the container.

25 Claims, 1 Drawing Sheet

U.S. PATENT DOCUMENTS

| | | | |
|---|---|---|---|
| 5,417,990 | * | 5/1995 | Soedjak et al. ......................... 426/89 |
| 5,422,134 | * | 6/1995 | Hart et al. ............................. 426/573 |
| 5,498,436 | * | 3/1996 | Modliszewski et al. ............ 426/573 |
| 5,562,939 | * | 10/1996 | Lewis ..................................... 426/250 |
| 5,633,030 | * | 5/1997 | Marrs et al. ......................... 426/573 |
| 5,654,027 | * | 8/1997 | Chalupa ............................... 426/573 |

* cited by examiner

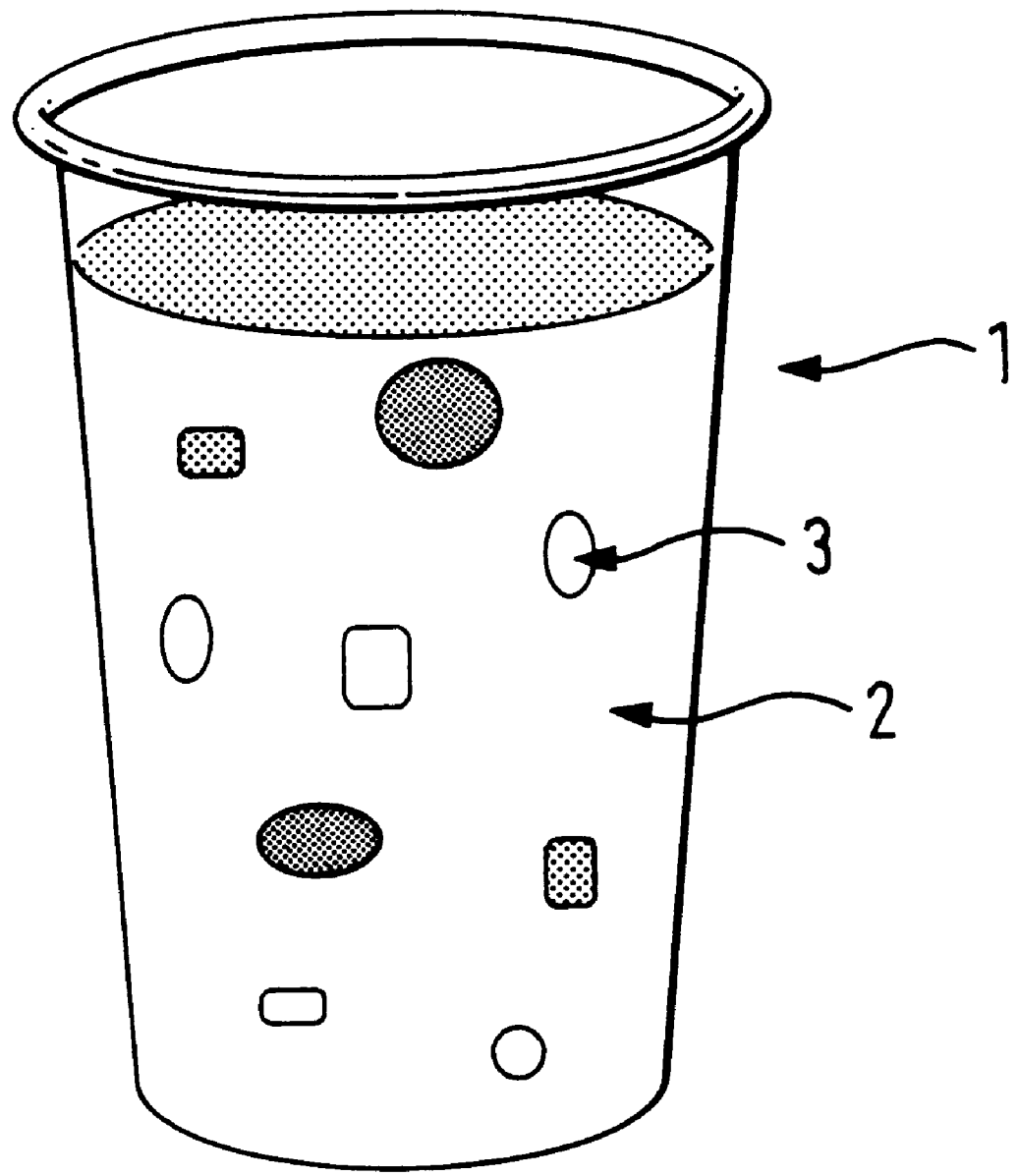

GELLED FOOD COMPOSITION INCLUDING FRUIT PIECES AND ITS PREPARATION

BACKGROUND OF THE INVENTION

The present invention relates to food compositions which contain a food gel component and their preparation and particularly to gelled compositions which contain a fruit phase, more particularly fruit pieces, and to combining component ingredients to thicken, gel and stabilize the compositions.

It is already known to prepare a gelled dessert with juice and chunks. U.S. Pat. No. 3,556,810 concerns an aqueous dessert gel containing as gelling agents a combination of four polysaccharides, such as calcium sensitive low-methoxy pectin, locust bean gum, a potassium-sensitive carrageenan and a calcium-sensitive carrageenan. However, the complicated composition of thickener, the unsolved degradation of some of the thickeners during heat-treatment and the known reduction of thickening at elevated temperatures makes this system not useful in manufacturing practice. U.S. Pat. Nos. 3,658,556 and 4,752,489 concern a process for preparing a gelled composition containing a homogeneous distribution of fruit pieces, said composition containing as gelling agents locust bean gum and carrageenan. In the process, the containers are rotated during sterilisation and cooled down to the setting temperature. The process requires a special handling which can be done only with canned products, but is not useful for cup filled desserts. Additionally, the movement during gel setting or just before induces uncontrollable variability of the gel texture.

SUMMARY OF THE INVENTION

The aim of the present invention is to have the possibility of preparing a water jelly by hot filling in order to overcome microbiological contamination, that is at a temperature of at least 70° C., which is the necessary temperature for filling in cups on not aseptic or not ultrahygienic filling lines, and with a thickening system which provides sufficient high viscosity of the jelly mass at 70° C., without degradation of said thickening system at the above mentioned temperature.

The invention provides a refrigerated water jelly comprising a jelly ground mass and a fruit phase made of fruit pieces, said pieces being uniformly distributed in the jelly ground mass, the jelly ground mass consisting of 50 to 90% and the fruit phase of 10 to 50% of the water jelly, wherein the jelly ground mass comprises in weight 0.4 to 0.7% of xanthan, a gelling compound taken from the group consisting of 0.5 to 1.5% of carrageenan, 0.4 to 1.0% of carrageenan together with 0.1 to 0.5% of locust bean gum and 0.1 to 0.5% of gellan gum and 15 to 30% sugar and wherein the fruit phase has a sugar content near to the sugar content of the jelly ground mass and contains between 0.4 and 0.7% of xanthan.

All of the percentages above and set forth in the remainder of this specification are by weight based upon the weight of the final water jelly composition.

The present invention further provides a process for the preparation of the water jelly, wherein a jelly ground mass is prepared by blending the afore-noted jelly ground mass ingredients at a temperature, such as a temperature around 70° C., so that the ingredients are suspended in the water, the mixture is heated to a temperature and for a time so that the jelly ground mass is at least pasteurized and then is cooled to a temperature which is not below a temperature which effects gellation, such as above 70° C., and then stored, and a fruit phase is maintained under aseptic conditions after sterilisation or pasteurisation, and subsequently, the so-treated fruit phase, at a temperature of from 10 to 20° C., is injected into a stream of the jelly ground mass, and the mixture so obtained is heated to reach a temperature above 70° C. and then is filled in a container and the container is sealed to contain the product mass in the container to obtain a packaged product mass, and the packaged mass is cooled to gel the product mass to obtain a gelled product mass in the container.

DETAILED DESCRIPTION OF THE INVENTION

For obtaining water jelly according to the invention, it is possible to run the production on existing filling lines. With the system of gelling and thickening agents, it is possible to obtain an homogeneous distribution of the fruit pieces in the jelly ground mass and said agents provide sufficient high viscosity of said jelly mass at 70° C. Otherwise, positive or negative lift evoked by the difference of specific gravity between jelly ground mass and fruit pieces leads to floating or deposit of the fruit pieces before the gel sets. The gelling part of the system allows a control of the desired gel firmness and texture without uncontrollable interactions with the thickening agent. Also the influence of heat and low pH on degradation of polysaccharides can be minimised.

The jelly ground mass contains both a thickener and a gelling agent. The thickener has been selected by the ability to build up a high viscosity even at elevated temperature, with little influence on the gel structure, and by sufficient stability against degradation at high temperature and low pH. Dispersions of xanthan have ideal properties for the purpose of the invention as they show a strong pseudoplastic behavior which is practically independent from temperature. Thus xanthan provides a high yield viscosity just after filling and stabilises the homogeneous distribution of the fruit pieces. A xanthan with very good transparency due to an additional refining process is preferably used. The concentration varies between 0.4 and 0.7%. Lower concentrations do not provide sufficient yield viscosity, and higher concentrations will increase the viscosity of the raw mix to a level too high for the transport in the tubes. A concentration of 0.5% is preferred.

The gelling agent used can be carrageenan, preferably kappa-carrageenan, which builds up a transparent gel. A good result can be obtained by blending kappa- and iota-carrageenan. Both products provide a transparent, slight elastic gel. The firmness is controlled by the concentration which can vary between 0.5 for a weak gel up to 1.5% for a very strong gel. Another possibility as gelling agent is a combination of carrageenan and locust bean gum. This combination increases strongly the gel strength without inducing elasticity, and in this embodiment the amount of carrageenan varies between 0.4 and 1% and that of locust bean gum between 0.1 and 0.5%. A further appropriate gelling agent is gellan gum, which is a hydrocolloid obtained by fermentation of sucrose by *Pseudomonas Elodea*. Gellan gum provides a transparent, firm and rigid gel even when used in low concentrations, which may vary from 0.1 to 0.5%.

All the above mentioned gelling agents have a sufficient stability against acid and heat, if the proposed processing will be applied. There is no interaction with xanthan affecting the gel structure and appearance negatively. The gel strength depends strongly from the amount of free mono- and divalent cations (e.g. sodium, potassium and calcium).

The water used for the preparation of the jelly has a calcium concentration of not more than 80 mg/l, which allows reaching an acceptable gel firmness.

The concentration of sugar depends primarily on the desired sweetness of the product and can vary in the jelly ground mass between 10 and 30%. The specific gravity of the jelly ground mass can vary between 1.04 and 1.13. The quantity of sugar in the fruit piece preparation, and thus in the fruit pieces, has to be adjusted to the quantity of sugar in the jelly ground mass and which then will adjust the specific gravity of the fruit piece preparation to that of the jelly ground mass. The adjustment of the specific gravity between both phases has to be carried out as exactly as possible in order to minimise the needed quantity of xanthan. Practically, the concentration of xanthan is set to 0.5%, while the difference in specific gravity between both phases should not exceed 0.02 g/ml, which corresponds to a difference in sugar concentration of at least 4.2%. This range of deviation is technically feasible in the industrial production for the jelly ground mass as well as for the fruit piece preparation.

Although the final product has a jelly ground mass consisting of 50 to 90% and a fruit phase comprising 10 to 50%, it is preferable to have a jelly ground mass of around 80% and a fruit phase around 20%. The product according to the invention has to be placed in the refrigerator and has a shelf life of at least 30 days at a storage temperature of 10° C.

The fruit piece preparation is a critical ingredient, as it provides all additional value to the product like flavour, texture of the pieces, and appearance. The fruit piece preparations were prepared in a batch cooking process and stored in aseptic container before they will be added to the final product. An insufficient pasteurised fruit preparation will cause growth of micro-organisms in the final product as the preparation will be added by flow injection after pasteurisation of the jelly ground mass. For additional safety, it is possible to add sorbic acid in an amount of 0.1 to 0.3%.

The sugar content in the fruit piece preparation has to be adjusted to adjust the specific gravity of the fruit piece preparation to the corresponding specific gravity of the jelly ground mass. Practically, the total sugar content (added sugar and that of the fruits) should be specified as the same as that of the jelly ground mass, and the total sugar content may be between 15 and 20%. The deviation from the specified sugar content must not exceed the above-mentioned given limits. Too large variation in the production of the fruit piece preparation will prevent the homogeneous distribution of the fruit pieces, as the differences in the specific gravity between the jelly ground mass and the fruit piece preparation will be too large.

The size of the fruit pieces can vary in range between 2 and 10 mm. The fruit pieces have to be stable against processing stress. All types of fruits can be used, for example pear, peach, apple, apricots and others. Some varieties, especially berry varieties like strawberry, are not available as firm pieces. For obtaining a strawberry-containing product, a fruit cocktail comprising mashed strawberries and pieces from pear and peach is used.

A stabilisation agent is necessary to be added in the fruit preparation. For simplifying the whole system, the same xanthan, which is already used in the jelly ground mass, is also used for the fruit preparation, and also at the same amount, that is between 0.4 and 0.7%.

The fruit piece preparation is the source for acidifying the whole product. The amount of an added edible acid depends on the natural acidity of the fruits and on the final pH of the product. For achieving a pH below of 4.0 and less, an amount of 0.2 to 0.5% of an edible acid is added in the fruit preparation. The edible acid is preferably citric acid.

An insufficiently pasteurised preparation will cause growth of micro-organisms in the final product, as the preparation will be added by flow injection after pasteurisation of the jelly ground mass. For additional safety, it is possible to add sorbic acid in an amount of 0.1 to 0.3%.

The production process consists of two sections. The first one is the preparation of the jelly ground mass and of the fruit phase, and the second is the flow addition of the fruit piece preparation to the jelly ground mass and the final filling procedure.

Concerning the first section, the thickener and the gelling agents are blended in water with powerful equipment, because the relative high amount of xanthan tends to lump. The premixing of the dry ingredients and the heating at around 70° C. helps significantly to suspend all the dry ingredients during the blending process. Afterwards, the mixture is heated, and most preferably pasteurised. A pasteurisation in combination with a pH lower than 4.4 is sufficient for microbiological stabilisation if the product is to be distributed under chilled conditions, as already above-mentioned. A heating up to 95° C. for 6 minutes is sufficient for the elimination of vegetative bacteria germs, moulds and yeasts. Taking in account the low pH of the final product, which is in the range of 3.6–3.8 and the storage under chilled conditions, a commercially safe product is manufactured. The heating is made with the use of a plate heat exchanger rather than a tube heat exchanger, as a plate heat exchanger provides a more granular structure to the jelly ground mass. Further, due to the high initial viscosity of the raw mix, the blending step incorporates high amounts of air bubbles which would be visible in the final product. A flash cooling reduces the amount of remaining air bubbles drastically, while cooling the jelly ground mass down to 70° C. for intermediate storage. In any case, the temperature must not decrease below 70° C. in all following steps, in order to prevent premature gellation in the line.

A jacketed storage vessel is used as buffer tank. The stability of the jelly ground mass is tested at a storage at 70° C. for 3 hours, and there is no consequence on the texture of the final product due to the neutral pH of 7.5 to 8.0 of said jelly ground mass.

The fruit phase is prepared by the addition of the amount of xanthan and eventually of citric acid to reach the required pH, and the fruit phase is then pasteurised or sterilised, filled into an aseptic container, and cooled to be kept under chilled conditions.

The jelly ground mass is preheated just after intermediate storage to compensate the low temperature of the added fruit piece preparation which is normally stored under chilled conditions, since it is necessary to maintain the filling temperature of at least 70° C. during the tube transport to the filling station in order to prevent premature gellation and to prevent germination of bacteria spores.

The addition of the fruit phase preparation to the jelly ground mass has to take place shortly before filling, as the exposure to the jelly mass at elevated temperatures will affect the stabilisation of the fruit pieces and the final texture of the water jelly.

The filling temperature has to be maintained at least at 70° C. for maintaining the hygienic effect against cross contamination. The filling nozzle has to be appropriate for filling products with pieces, and after filling, a lid is then sealed on the top of the cup, and an appropriate cooling of the final product by a cooling tunnel is important, as the low pH can cause changes in the gel texture. The stabilisation of the fruit pieces was not affected by the filling process.

Further description is made with reference to the sole drawing FIGURE which accompanies this disclosure.

BRIEF DESCRIPTION OF THE DRAWING FIGURE

The drawing FIGURE of this application is a schematic view of a water jelly composition containing pieces according to the present invention.

DETAILED DESCRIPTION OF THE DRAWING FIGURE

The cup (1), which is made preferably in polypropylene, presents an upper lip, where a cover or lid (not shown) has to be sealed on. The cup contains the jelly ground mass (2), containing the xanthan and a gelling agent, and the fruit phase preparation (3) made of different types of pieces. It is possible to have also different types of fruits in the same cup. The product according to the invention can be kept in the refrigerator under chilled conditions during at least 3 weeks and has normally a content of 100 to 150 g.

The following examples give a more detailed description of the invention.

EXAMPLES

The following table gives three different recipes of the jelly ground mass.

| Ingredients, % | Recipe 1 | Recipe 2 | Recipe 3 |
|---|---|---|---|
| Water | 80.5 | 80.5 | 81.3 |
| Sugar | 18.0 | 18.0 | 18.0 |
| Xanthan | 0.5 | 0.5 | 0.5 |
| Carrageenan | 1.0 | 0.8 | 0 |
| Locust bean gum | 0 | 0.2 | 0 |
| Gellan gum | 0 | 0 | 0.2 |

The following table gives three different recipes of the fruit piece preparation.

| Ingredients, % | Apple | Peach | Strawberry cocktail |
|---|---|---|---|
| Fruit pieces | 70 | 70 | Strawberry, 27.5 pear, 27.5 peach, 15 |
| Sucrose | 9.5 | 11.0 | 10.0 |
| Citric acid | 1.0 | 1.0 | 1.0 |
| Xanthan | 0.5 | 0.5 | 0.5 |
| Aroma | 0.25 | 0.45 | 0.2 |
| Food colors | 0.003 | 0.025 | 0.003 |

It is then possible to make the 9 possible combinations of 80% of the jelly ground mass and 20% of the fruit piece preparation.

The water jelly is transparent and is filled into transparent cups of polypropylene with a texture similar to gelatine. The fruit pieces are homogeneously distributed in the mass and have a size comprised between 2 and 10 mm, and in average, they have a diameter of 8 mm. The gel is colored with natural or artificial colors fitting to the variety of fruit pieces. The product has a good gel firmness. The shelf life of the product is over 6 weeks under chilled conditions of 12° C. There was no growth of micro-organisms. Appearance, gel firmness and mouthfeeling remained stable during the shelf life in all tested recipes. The pH of the jelly ground mass is comprised between 7.5 and 8, that of the fruit preparation around 3.0 and the pH of the final product is comprised between 3.5 and 3.8.

What is claimed is:

1. A process for preparing a gelled food composition containing fruit pieces comprising:

blending ingredients into water to obtain a jelly ground mass, the ingredients comprising, in amounts by weight based upon jelly ground mass weight, sugar in an amount of from 15% to 30%, xanthan in an amount of from 0.4% to 0.7% and a gelling agent which is a composition or a combination of compositions selected from the group consisting of (i) a carrageenan composition in an amount of from 0.5% to 1.5%, (ii) a carrageenan composition in an amount of from 0.4% to 1.0% and locust bean gum in an amount of from 0.1% to 0.5% and (iii) gellan gum in an amount of from 0.1% to 0.5% and wherein the ingredients are blended at a temperature so that the ingredients are suspended in the water;

heating the jelly ground mass to a temperature and for a time to at least pasteurize the jelly ground mass and then cooling the so-heated jelly ground mass, but only to a temperature which is not below a temperature which effects gellation of the jelly ground mass, to obtain a temperature-treated jelly ground mass;

preparing a fruit composition which comprises fruit pieces and xanthan wherein the xanthan is in an amount, by weight based upon the weight of the fruit composition, of between 0.4% and 0.7% and which has a sugar content which differs from the jelly ground mass sugar content so that a difference between the jelly ground mass specific gravity and the fruit composition specific gravity does not exceed 0.02 g/ml so that upon subsequently combining the jelly ground mass and the fruit composition at a temperature above 70° C., the fruit composition is present and distributed within the jelly ground mass;

heating the fruit composition to a temperature and for a time to at least pasteurize the fruit composition and cooling the so-heated fruit composition to obtain a cooled fruit composition and maintaining the cooled fruit composition under aseptic conditions;

providing a stream of the temperature-treated jelly ground mass having a temperature which is not below a temperature which effects gellation of the jelly ground mass and injecting the fruit composition, at a temperature of from 10° C. to 20° C., into the jelly ground mass stream to combine the cooled fruit composition into the jelly ground mass stream to obtain a combined composition stream containing, in amounts by weight based upon the combined composition weight, the jelly ground mass in an amount of from 50% to 90% and the fruit composition in an amount of from 10% to 50%, and then heating the combined composition stream to a temperature above 70° C. for preventing gellation to obtain a heated composition for filling into a container;

filling the heated composition into a container and sealing the container to contain the composition in the container to obtain a packaged product mass; and cooling the packaged product mass to gel the product mass to obtain a gelled product mass in the container.

2. A process according to claim 1 wherein the jelly ground mass ingredients are blended in amounts and the fruit composition is prepared so that the combined composition has a sugar content, by weight based upon the combined composition weight, of between 15% and 20%.

3. A process according to claim 1 wherein the water component of the jelly ground mass has a calcium concentration of not more than 80 mg/l.

4. A process according to claim 1 wherein the fruit composition is prepared with an edible acid to acidify the fruit composition.

5. A process according to claim 4 wherein the fruit composition is prepared with the edible acid in an amount, by weight based upon the fruit composition weight, of from 0.2% to 0.5%.

6. A process according to claim 4 or 5 wherein the edible acid is citric acid.

7. A process according to claim 1 wherein the gelling agent is a carrageenan composition.

8. A process according to claim 1 wherein the gelling agent is a combination of a carrageenan composition and locust bean gum.

9. A process according to claim 1 wherein the gelling agent is gellan gum.

10. A process according to claim 1 wherein the fruit pieces have a size of between 2 mm and 10 mm.

11. A process according to claim 1 wherein fruit of the fruit composition is selected from the group consisting of pears, peaches, apples, apricots and strawberries.

12. A process according to claim 1 wherein the jelly ground mass is heated with a plate heat exchanger.

13. The gelled product mass of the process according to claim 1.

14. The gelled product mass of the process according to claim 2.

15. The gelled product mass of the process according to claim 5.

16. A gelled food composition containing fruit pieces distributed therein wherein the gelled composition comprises a combination of a fruit composition component and a jelly ground mass composition component wherein, by weight based upon a weight of the gelled composition, the fruit composition component is in an amount of from 10% to 50% and the jelly ground mass composition component is in an amount of from 50% to 90% and wherein the fruit composition component comprises fruit pieces and, in an amount by weight based upon the fruit composition component weight, xanthan in an amount of from 0.4% to 0.7% and wherein the jelly ground mass component comprises a water component and, in amounts by weight based upon jelly ground mass weight, sugar in an amount of from 15% to 30% and xanthan in an amount of from 0.4% to 0.7%, and a gelling agent component which is a composition or a combination of compositions selected from the group consisting of (i) a carrageenan composition in an amount of from 0.5% to 1.5%, (ii) a carrageenan composition in an amount of from 0.4% to 1.0% and locust bean gum in an amount of from 0.1% to 0.5% and (iii) gellan gum in an amount of from 0.1% to 0.5% and wherein a difference between the jelly ground mass phase specific gravity and the fruit composition phase specific gravity does not exceed 0.02 g/ml.

17. A gelled composition according to claim 16 wherein the gelled composition comprises sugar in an amount of between 15% and 20%.

18. A gelled composition according to claim 16 wherein the composition has a pH of below 4.0.

19. A gelled composition according to claim 16 wherein the gelling agent component is a carrageenan composition.

20. A gelled composition according to claim 16 wherein the gelling agent component is a combination of a carrageenan composition and locust bean gum.

21. A gelled composition according to claim 16 wherein the gelling agent component is gellan gum.

22. A gelled composition according to claim 16 wherein the fruit pieces have a size of between 2 mm and 10 mm.

23. A gelled composition according to claim 16 wherein the fruit pieces are selected from the group consisting of pears, peaches, apples and apricots.

24. A gelled composition according to claim 16 wherein the gelled composition contains material of berries.

25. A gelled composition according to claim 16 wherein the gelled composition contains material of strawberries.

* * * * *